Mar. 3, 1925. 1,528,269

W. SCHOENFELD

CAR UNLOADER

Filed Nov. 21, 1923 2 Sheets-Sheet 1

INVENTOR:
Walter Schoenfeld.
BY A. M. Carlsen
ATTORNEY.

Patented Mar. 3, 1925.

1,528,269

UNITED STATES PATENT OFFICE.

WALTER SCHOENFELD, OF ST. PAUL, MINNESOTA.

CAR UNLOADER.

Application filed November 21, 1923. Serial No. 676,021.

*To all whom it may concern:*

Be it known that I, WALTER SCHOENFELD, a citizen of Germany, residing at St. Paul, in the county of Ramsey and State of Minnesota, have invented certain new and useful Improvements in Car Unloaders, of which the following is a specification.

My invention relates to car unloading devices and the object is to provide a simple and efficient device particularly adapted for facilitating the unloading of grain from railway cars.

In the accompanying drawings:

Fig. 8 is a modification of the upper portion of the main column of my device showing the method of suspending it from a truck adapted to run on overhead rails 15.

Figure 1:
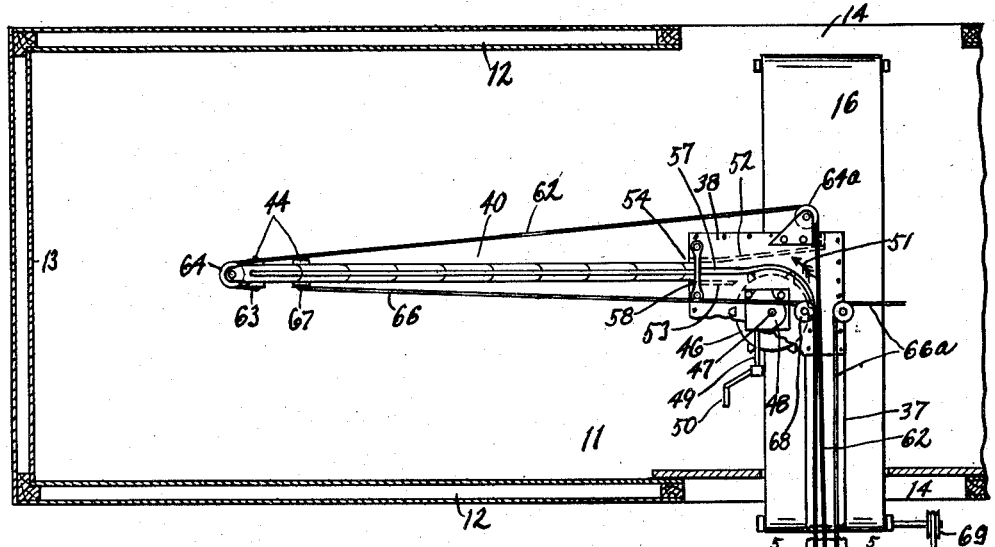
Fig. 1 is a plan view of my invention illustrating a part of a box car in horizontal section and the column of my device in section as at 1—1 in Fig. 2.

Referring to the drawings by reference numerals 8 is a raised platform such as are usually built adjacent a railway track 9 at a grain elevator or freight terminals. 10 represents the wheels of a grain car of which 11 is the floor 12 the side walls, 13 the end walls and 14 the door openings in the opposite side walls.

My device comprises in general a vertical mast or column mounted either permanently on the platform 8 or suspended from an overhead track 15 (see Fig. 8) said track being arranged parallel to the car track. In the latter case the column is suspended from a truck adapted to travel on the track 15.

Adjustable means are provided on said mast or column and which may be projected into the interior of one car at a time other means being provided on the part within the car for scooping the grain from either or both ends of the car toward the center, from where it is carried out of the car by any suitable belt conveyor 16 which dumps the grain into a hopper 17 in the elevator platform 8.

In either the stationary or traveling type the column or mast comprises preferably four corner posts 18 of channel iron the upper ends of which are secured as at 19 to a spider 20 and the lower ends secured as at 21 to a spider 22. In the permanently mounted type of mast the spider 22 has a central downwardly extending swivel pin 23 (see Fig. 2) adapted to rotate in a bearing 24 of a floor plate 25 secured at 26 to the platform 8. In the traveling type of column the lower spider 22 is plain but the upper spider 20 has a central upwardly projecting swivel pin 27 adapted to rotate in a bearing 28ª of a truck 28 having wheels 29 on track 15. The pin is headed as at 27ª above the bearing 28ª.

Figure 2:
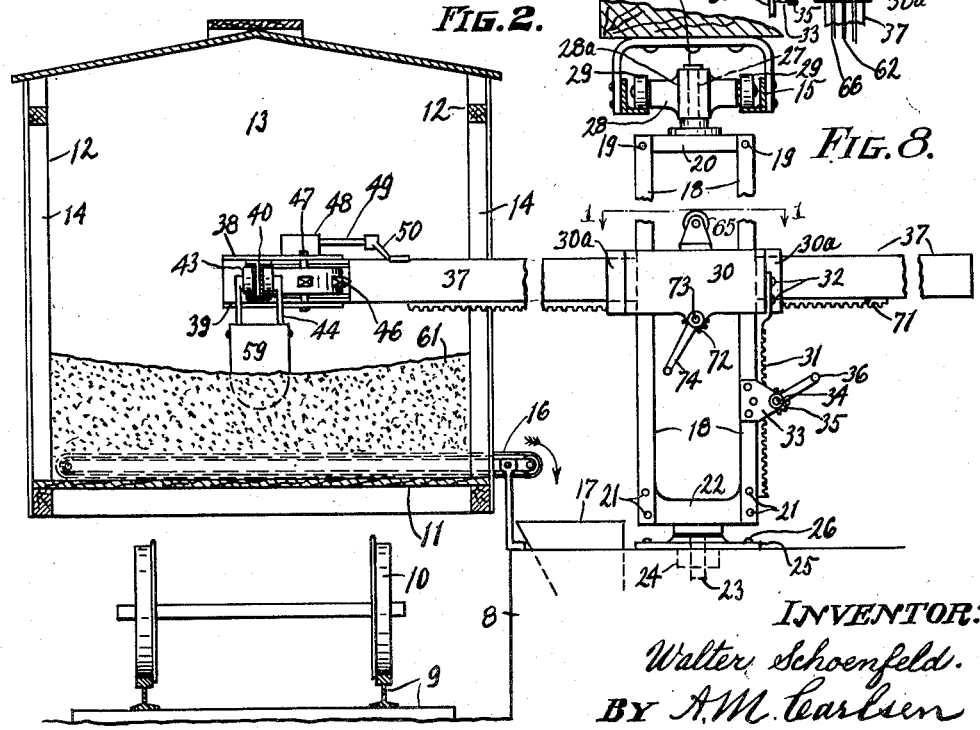
Fig. 2 is an elevation of my device looking as from left to right in Fig. 1, showing the car in section and partly filled with grain, and also showing two ways of mounting my device on a platform adjacent the car track.
Figure 3:
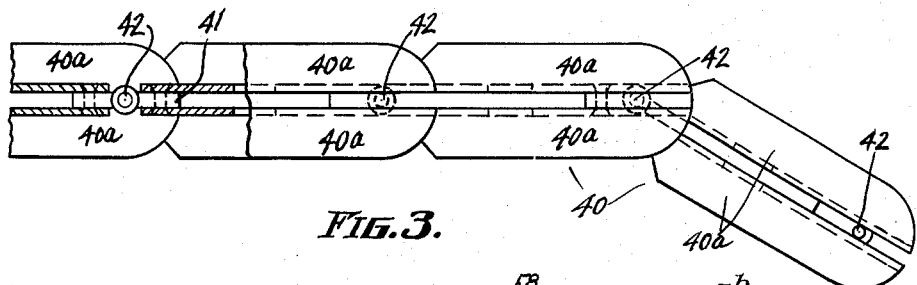
Fig. 3 is an enlarged top view of a portion of the sectional traveling beam used in my device, certain details being omitted.

30 is a collar slidably engaging the outer surfaces of the column members 18, and 31 is a toothed rack suitably secured to the collar as at 32 and extending below the collar and adjacent one of the members 18 (see Fig. 2). On the latter member I secure a bracket 33 with a bearing for a stub shaft 34 on one end of which is keyed a sprocket 35 at all times engaging rack 31 and on the other end of the shaft is fixed a hand crank 36 by means of which the collar 30 may be raised or lowered to any desired height on the column. The collar 30 is provided with two oppositely arranged projections 30ª in which are horizontally registering rectangular slots normally slidably engaged by a horizontally adjustable boom 37 the latter being rectangular in cross section and of hollow construction and may have a central fixed, longitudinal partition 37ˣ for a purpose to be described. One end of the boom is adapted to be projected into a grain car and carries an integral head comprising an upper and lower plate 38—39 respectively (see Figs. 1 and 2) upon and between which are operated and mounted the means for scooping grain from the ends of the car toward the center of it.

I have illustrated my device as made for cleaning the grain out from one end of a car only, but it will be readily understood from the following description that it can be made as a double unit moving the grain from both ends of the car toward the center simultaneously.

40 is what may be designated an extensible link beam adapted to be extended from the head 38—39 of the boom to the end wall 13 of the car. Said beam comprises a series of links each of which consists of two spaced channel irons $40^a$, with their webs adjacent and held in spaced relation to each other by the wings of hinges 41 connecting the links, and each said hinge has a vertical pin 42 enabling the link members of the beam to be swung out of alignment in horizontal direction only. When in alignment the above beam resembles an I-beam on and between the flanges of which the wheels 43 of a truck 44 may travel. 45 are apertures located centrally in the adjacent webs of each link and are adapted to be engaged by the teeth of a large sprocket wheel 46 rotatably mounted on a shaft 47 (see Figs. 1 and 2) journaled in the head plates 38—39. Said shaft 47 projects into a housing 48 mounted on plate 38 and inclosing any suitable gear reduction or equivalent (not shown) operatively connecting shaft 47 with a shaft 49 having a hand lever 50.

Figure 4:
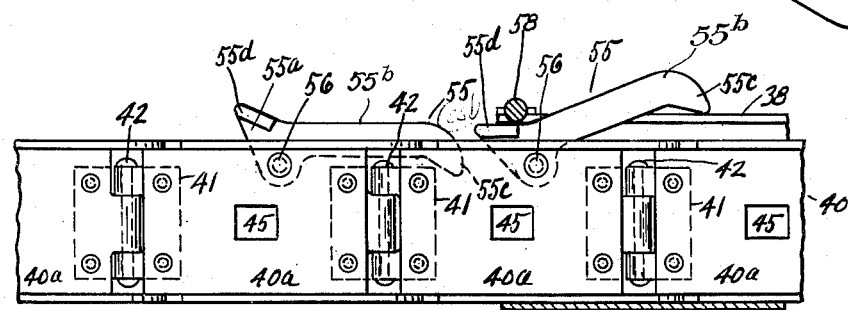
Fig. 4 is a face view of all but the right hand link in Fig. 3, the parts lacking in Fig. 3 being shown.

The traveling beam 40, when not in use, occupies the hollow boom 37 and the above described sprocket 46 is so located that one or more of its teeth engage in a link of said beam. When crank 50 is turned, sprocket 46 is rotated as in direction of arrow 51 (Fig. 1) said links follow the curvature of the sprocket rim to a position approximately at right angles to the boom, being guided partly by partitions 52—53 within the head (see dotted lines in Fig. 1) so that the links will emerge from the head horizontally and at right angles to the boom as at 54 in Fig. 1. As the links continue to move out of the head they are automatically locked in alignment to form a rigid beam, extensible to the end wall of the car. The automatic locking means consist of a horizontally disposed flat bar 55 pivoted between the channel members of each link as at 56, such bar being bent to form a short forward and upwardly projecting arm $55^a$ and a long rearwardly projecting arm $55^b$ at an obtuse angle to the first arm. The extremity of arm $55^b$ may be bent down to form a finger $55^c$, said arm and finger adapted to engage in the slot between the channel members $40^a$ of the link to which it is pivoted and its extremity simultaneously engages between the channels of the adjoining and following link when the said arm is in horizontal position (see to the left in Fig. 4), thus locking the said two links in alignment. A succession of such locked links form a rigid beam. When the beam links travel past the sprocket 46 the lock arms 55 must of course be disengaged so the links can follow the curve of the sprocket and then be moved into the hollow boom. For example if it is assumed that the links in Figs. 1 and 4 are being moved to the right into housing 38—39, I provide a slot 57 in plate 38 and across said slot is placed an obstructing bar 58 at such height that the link arms $55^b$ will pass under it but will contact with the upwardly extended arm $55^a$ which will be forced down and arm $55^b$ forced up out of its locking position. The latter arm, $55^a$, is provided with two oppositely arranged integral wings $55^d$ which will engage the under side of plate 38 at both sides of slot 57 thus holding the locking ends $55^b$ of the bars 55 out of locking position as long as the link members are within housing 38—39 or the boom 37, the slot 57 being of course curved in plate 38 to correspond to the direction the links move but being straight in the boom cover $37^a$.

It will be readily seen that when the beam links are moved in the opposite direction bar 58 will engage the upper edge of the locking arms $55^b$ as the links are moved outwardly and forces the said arms down to their locking position, one by one, said bar 58 being so near the end of housing 38—39 that there is no obstruction to prevent the resulting upward movement of arms $55^a$ as they come out from under head plate 38.

Figures 5, 6, 7:
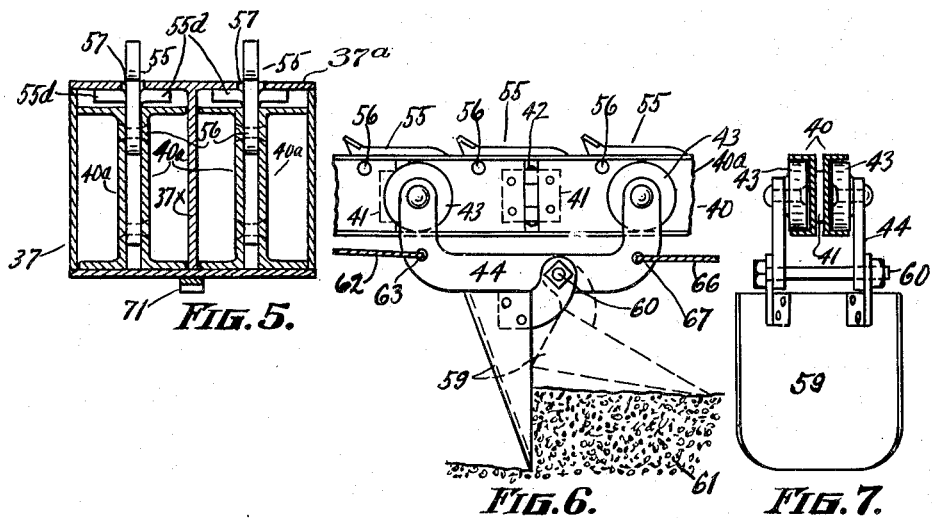
Fig. 5 is an enlarged sectional elevation of the adjustable boom 37, as at 5—5 in Fig. 1.
Fig. 6 is a side elevation of a portion of the traveling beam of my device, the rolling truck used thereon and the grain scoop of the truck.
Fig. 7 is a right hand end elevation of Fig. 6.

59 is a grain scoop of any suitable form, pivoted at 60 to the truck frame 44 so that when it travels toward the center of the car grain is scooped or pushed in front of it as illustrated in Fig. 6, but in traveling toward the end of the car the scoop may swing on its pivot 60 and ride on top of the grain 61.

62 is a cable secured to crane truck 44 as at 63 then passed over a pulley 64 on the head beam link thence to another pulley $64^a$ on the head and thence over the top of the beam and guided on one of a group of pulleys 65 (mounted on collar 30) to any suitable source of power. This cable serves to pull the scoop from the head of the boom to the end of the beam near the end of the car. Another cable 66 is attached to the truck 44, as at 67, passed over a pulley 68 (Fig. 1) and thence over one of pulleys 65 to the source of power, this cable serving to pull the scoop toward the center of the car and moving the grain.

It is apparent that the mechanism described could be made in duplicate, in which case another link beam, scoop and operating means therefor would be provided and the boom head enlarged, additional pulleys put in etc., thus providing means for unloading a car from both ends simultaneously. 66ª in Fig. 1 indicates the scoop pulling cable that would be installed in a double acting device but I have illustrated no other required construction for such device.

69 (in Fig. 1) is a drive pulley operatively connected to one end of the belt conveyor 16 and driven by a belt or like means 70 from any suitable source of power to move the conveyor belt in a direction to carry the grain out of the car and deliver it to the hopper 17.

It is not considered necessary to illustrate a source of power it being readily understood that any electric or steam hoisting machine with the proper number of drums and winches and control levers will easily take care of the proper movement of the cables.

71 is a rack secured on the under side of the boom and is normally engaged by a pinion 72 on shaft 73 journaled in collar 30 and rotated by a hand crank 74 for moving the boom horizontally, as desired.

In the use of the device the car door opening and my device are first brought into proper relative position. At this time the boom is set with the major part of it away from the car and only the head 38—39 is adjacent the car door opening, it being assumed that the link beam has been drawn into the head and boom. The boom is then raised to the desired height above the grain level of the car then moved horizontally into the car until the head is about half way between the side walls 12. An operator then turns crank 50 until the sectional beam is projected to the end wall of the car. Said projected beam sections or links are of course in rigid alignment and after the cable lengths have been adjusted to correspond to the length of beam the device is ready for the removal of grain.

What I claim is:

1. In a car unloader a vertical column, a horizontal boom vertically and horizontally adjustable on said column, a head on one end of said boom, a sectional beam projectible angularly to various lengths from the boom and adaptable to be housed in said boom, means on said head for withdrawing said beam sections from the boom and moving them out from the head in a horizontal plane with the boom, means automatically interlocking said beam sections in rigid alignment as they are moved from said head, and grain handling means mounted on said rigid beam sections.

2. The structure specified in claim 1, said interlocking means adapted to be disengaged when the sectional beam is drawn into the boom.

3. The structure specified in claim 1, in which the sections of said beam are each provided with an aperture in its web, said means for withdrawing the sectional beam comprising a toothed wheel the teeth of which are adapted to engage each in an aperture to move the beam out of the boom, a driving shaft mounted in the head of the boom and operatively connected with said toothed wheel to rotate it.

4. The structure specified in claim 1, said means for interlocking the beam sections in linear relation comprising a beam lever pivoted in each section to rock in a vertical plane and longitudinally of the beam, one arm of said lever shorter than the other and said arms arranged at obtuse angles, the longer arm adapted when in horizontal position to engage the adjoining beam section to hold the two sections in alignment when they are moved away from the head of the boom, and means for disengaging said lever arm when the beam sections are moved into the boom.

5. The structure specified in claim 1, said means for interlocking the beam sections in linear relation comprising a beam lever pivoted in each section to rock in a vertical plane and longitudinally of the beam, one arm of said lever shorter than the other and said arms arranged at obtuse angles, the longer arm adapted when in horizontal position to engage the adjoining beam section to hold the two sections in alignment when they are moved away from the head of the boom, and means for disengaging said lever arm when the beam sections are moved into the boom, said disengaging means comprising a bar fixed transversely of the said beam, on the head, to engage the short lever arm and raise the long arm out of its locking engagement.

6. In a car unloading device of the class described, a rotatable mast mounted near a car track, a hollow boom adjustable vertically and horizontally on said mast to move one end of the boom into a car standing on said track, a head on said end of the boom, a sectional beam slidable within said boom, means for projecting said beam variable distances from out of said head at right angles to the boom and in a direction toward the end wall of the car, said projecting beam sections adapted to be maintained rigidly in alignment for the purpose set forth.

In testimony whereof I affix my signature.

WALTER SCHOENFELD.